United States Patent
Müller et al.

(10) Patent No.: US 6,589,126 B1
(45) Date of Patent: Jul. 8, 2003

(54) CONTINUOUSLY VARIABLE TRANSMISSION

(75) Inventors: Eric Müller, Kaiserslautern (DE); Oswald Friedmann, Lichtenau-Ulm (DE)

(73) Assignee: Luk Lamellen und Kupplumasbau Beteilgungs KG, Bühl (DE)

( * ) Notice: Subject to any disclaimer, the term of this patent is extended or adjusted under 35 U.S.C. 154(b) by 0 days.

(21) Appl. No.: 09/707,161

(22) Filed: Nov. 6, 2000

(30) Foreign Application Priority Data

Nov. 8, 1999 (DE) .......................... 199 53 579

(51) Int. Cl.[7] .......................... F16H 63/04; F16H 61/00
(52) U.S. Cl. .................. 474/12; 474/17; 474/8
(58) Field of Search .................. 474/12, 8, 13, 474/14, 15, 37, 38, 16, 11, 43, 46, 18

(56) References Cited

U.S. PATENT DOCUMENTS

| | | | | |
|---|---|---|---|---|
| 4,228,691 A | * | 10/1980 | Smirl | 474/12 |
| 4,534,232 A | * | 8/1985 | Stieg | 474/12 |
| 4,564,357 A | * | 1/1986 | Thirion de Briel | 474/14 |
| 4,617,005 A | * | 10/1986 | Jaccod et al. | 474/13 |
| 4,772,248 A | * | 9/1988 | De Briel | 474/14 |
| 6,248,035 B1 | * | 6/2001 | Bartlett | 474/100 |

* cited by examiner

Primary Examiner—Marcus Charles
(74) Attorney, Agent, or Firm—Alfred J. Mangels

(57) ABSTRACT

A continuously variable transmission for a motor vehicle. The transmission includes an adjustable width drive pulley and an adjustable width output pulley that are drivingly connected by an endless torque-transmitting member. The drive pulley includes a spring to bias the movable element of the pulley toward a position at which the spacing between the conical disks that define the pulley are at a minimum, to avoid damage to the transmission when the vehicle is being towed.

10 Claims, 2 Drawing Sheets

CONTINUOUSLY VARIABLE TRANSMISSION

BACKGROUND OF THE INVENTION

1. Field of the Invention

The present invention relates to a continuously variable transmission. More particularly, the present invention relates to a continuously variable transmission having input and output pulleys that are adjustable in width and about which an endless torque-transmitting member passes, wherein the transmission ratio is variable.

2. Description of the Related Art

Continuously variable transmissions are generally known. The essential elements of such a transmission are shown in FIG. 3, which represents a section through the main structure of such a mechanism, that is, the speed-varying portion of a continuously variable transmission. A drive shaft 2 is driven by a drive motor (not shown) of a motor vehicle. Fixedly attached to the drive shaft, or constructed in one piece therewith, is a first conical disk 4 of a pair of conical disks that define a pulley 6, the other conical disk 8 of which is non-rotatably but axially movably connected with shaft 2. Also fixedly attached to drive shaft 2 is a backup ring element 10, between which and conical disk 8 are formed a pressure chamber 12, to which is admitted a torque-dependent hydraulic pressure, and an adjustment chamber 14, to which is admitted an hydraulic adjustment pressure. The admission of pressure medium into the chambers occurs through ports and corresponding throughbores in drive shaft 2 that are not individually illustrated.

An output shaft 22 is connected with a pulley and related hydraulic chambers in a manner similar to that of the drive shaft, whereby corresponding elements are provided with reference numerals that are higher by 20 than those for the drive shaft pulley. The pulleys 6 and 26 are spanned by an endless torque-transmitting member 40 that transmits rotation of drive shaft 2 to rotation of output shaft 22, and during deceleration it transmits rotation in the reverse direction. In the illustrated arrangement the spacing between the conical disks 4 and 8 is at a maximum, and that between conical disks 24 and 28 is at a minimum, so that the transmission produces the lowest possible transmission ratio, that is, it is in underdrive. When the spacing between conical disks 4 and 8 diminishes and the spacing between conical disks 24 and 28 correspondingly increases, the transmission crosses over the condition when the transmission ratio is 1, increasing to overdrive.

The construction, function, and control of such devices are known and therefore will not be further explained herein.

In continuously variable transmissions of the type such as that shown in FIG. 3, it is common, for various reasons, to make the oil supply for the transmission, that is the oil pressure, with which the oil requirements for lubricating oil are supplied, to be made dependent upon the motor rotational speed. A breakdown of the engine, thereby necessitating a towing operation, can result in unusually rapid rotation of the pulley 6, particularly for the illustrated underdrive condition of the transmission, whereas the pulley 26 that is connected to the vehicle's driven wheels rotates slowly. The high rotational speeds can lead to damage to the motor-side pulley 6 and with it to associated components.

The invention has as an object to provide a solution to the above-mentioned problem.

SUMMARY OF THE INVENTION

Briefly stated, in accordance with one aspect of the present invention, a continuously variable transmission is provided that includes a drive side pulley and an output side pulley, and an endless torque-transmitting member that spans the pulleys, wherein the spacing between the conical disks that define each pulley is adjustable for varying the transmission ratio. A spring is provided that ensures that when the engine is stopped, and if necessary also if the transmission still has hydraulic medium under pressure, a force is exerted on the movable conical disk which takes the transmission, that is the variator, out of an underdrive condition during a towing operation, so that the rotational speed of the input side pulley 6 is decreased and the danger of damage is diminished, and in certain respects is completely avoided.

The invention can be employed everywhere that continuously variable transmissions can be in towed operation and in which there exists the danger of deficient lubrication from high rotational speeds of the input side pulley.

BRIEF DESCRIPTION OF THE DRAWINGS

The invention will be explained in further detail in the following description by way of example and on the basis of the following drawings, in which.

DESCRIPTION OF THE PREFERRED EMBODIMENTS

Figure 1:
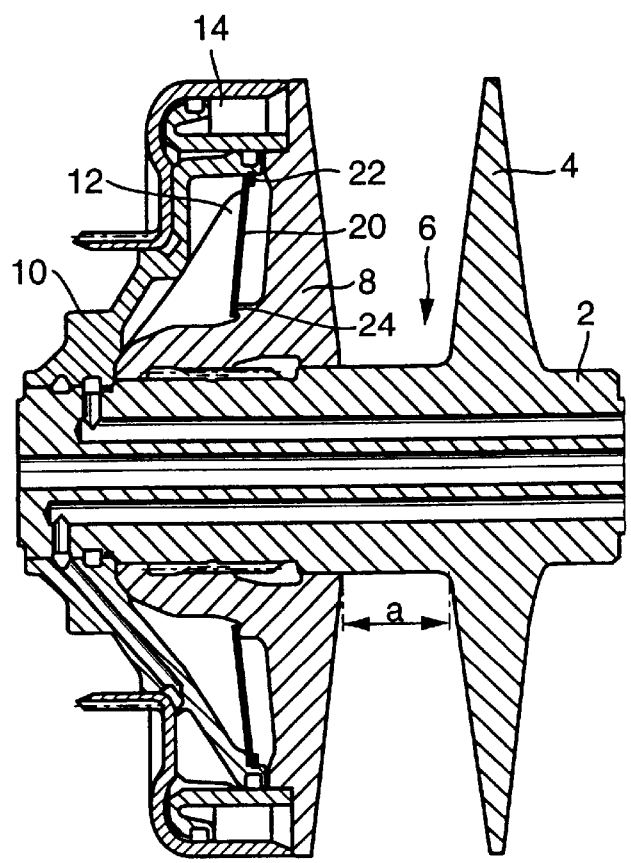
FIG. 1 shows a drive side pulley provided with a disk spring in accordance with the present invention.
Figure 3:
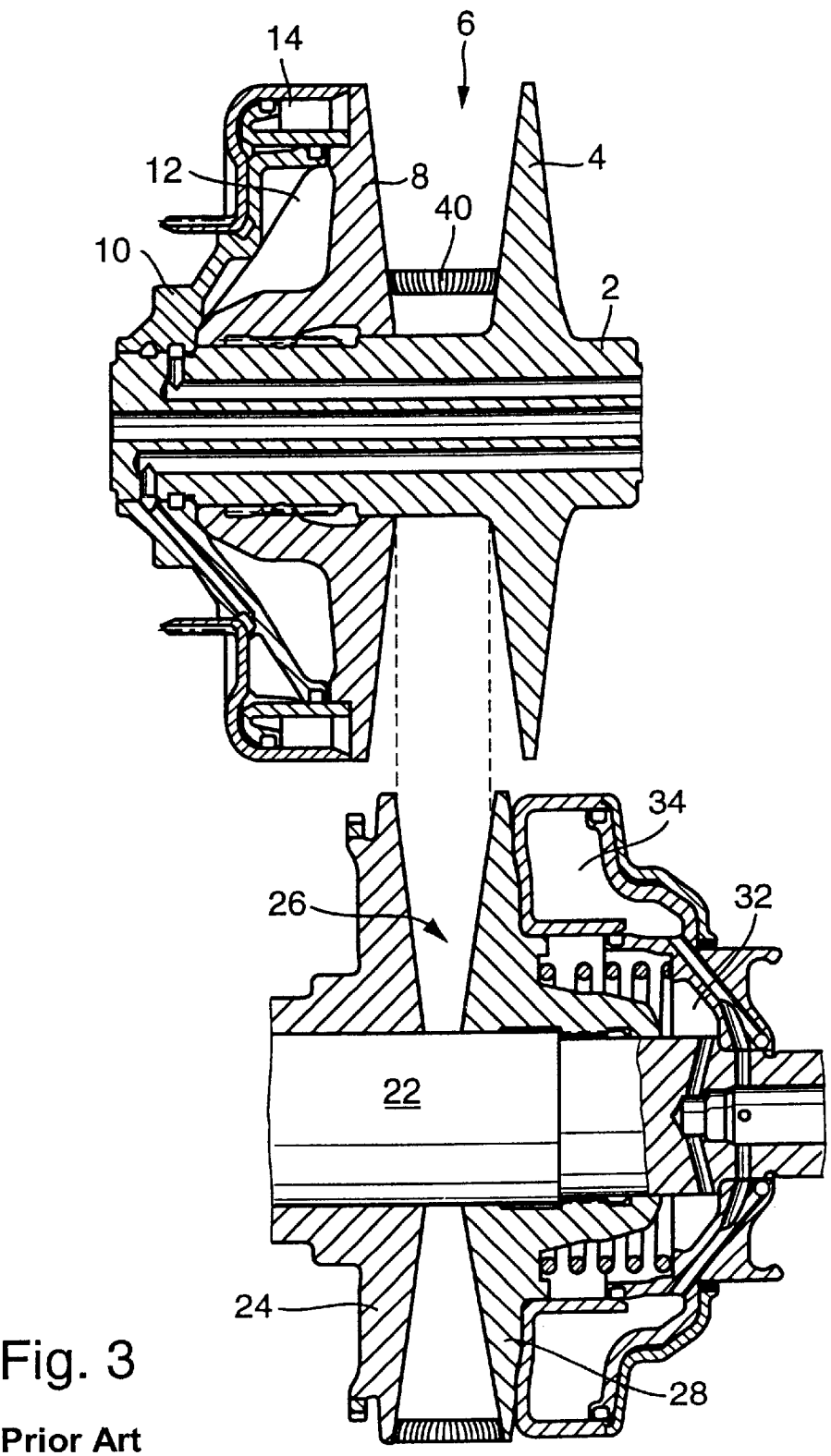
FIG. 3 is a sectional view of essential elements of the already-described, known continuously variable transmission.

FIG. 1 shows pulley 6 of FIG. 3, wherein the same reference numerals are utilized for corresponding elements. Pulley 6 of FIG. 1 is distinguished from that shown in FIG. 3 in that a disk spring 20 operates between backup ring 10 and axially-movable conical disk 8. Disk spring 20 is received in an inner peripheral groove 22 of an outer cylindrical region of backing ring 10 and is supported radially inwardly of peripheral groove 22 on a shoulder 24 of conical disk 8.

Figure 2:
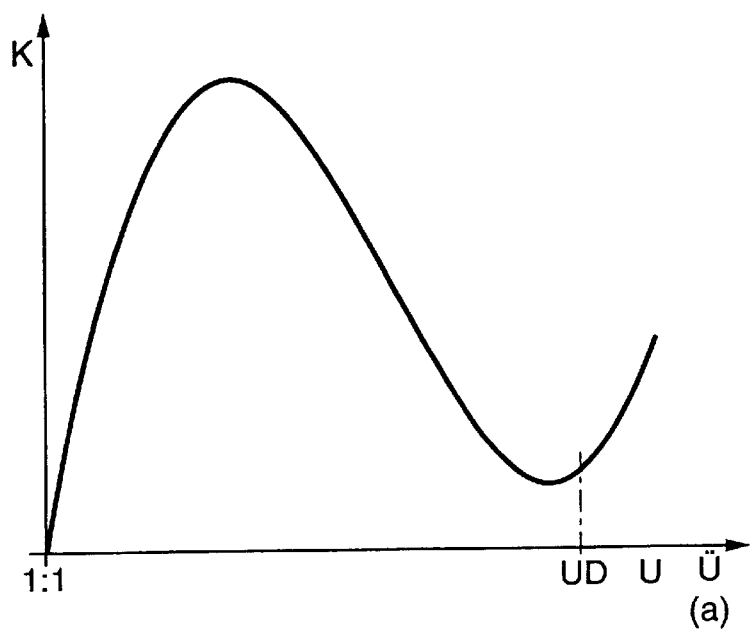
FIG. 2 is a graph to explain a preferred force path characteristic curve for the disk spring of FIG. 1.

Disk spring 20 is constructed in such a way that it produces a force gradient in accordance with the curve shown in FIG. 2, which represents a force K that depends upon the transmission ratio $\ddot{U}$ of the transmission, that is, as determined by the spacing a between conical disks 4 and 8. As a result, the force acts to the right, as viewed in FIG. 1, against conical disk 8. As shown in FIG. 2, the rightwardly-operating force, as viewed in FIG. 1, passes toward the region of underdrive UD, that is, in a practical device, at a maximally-occurring spacing a between the conical disks 4 and 8, and as spacing a increases the force approaches a minimum and then increases.

As the spacing between the conical disks decreases, after passing through a maximum the force diminishes toward the value zero, when the spacing between the conical disks has diminished to a value that corresponds with a transmission ratio 1:1. When the conical disks 4 and 8 move further closer together, so that the transmission gradually passes into overdrive, shoulder 24 is separated from disk spring 20 so that no further force is produced by disk spring 20 on conical disk 8.

Unexpectedly, it appeared that with the towed transmission of FIG. 3 for an adjustment of the transmission out of the position UD in the direction of 1:1 at first only small forces are necessary, which then during further adjustment strongly increase. In order not to disturb the functioning of the continuously variable transmission in normal vehicle operation, disk spring 20 is so designed that the force requirements are just fulfilled. That means that the force starting from the region UD clearly increases, and reaches its maximum shortly before the transmission ratio 1:1, and then falls off steeply. As is apparent, it is advantageous when the increase in the force K, starting from UD, increases slower than the force decreases shortly before the transmission ratio 1:1, so that the maximum force lies near the transmission ratio 1:1.

As it is sufficient during towing to operate the transmission in the vicinity of the position 1:1 to avoid damage, disk spring 20 only exerts a force in the region between UD and the vicinity of 1:1, whereas the pressure requirements to adjust the transmission ratio in the other transmission ratio regions remain totally uninfluenced by the disk spring.

It should be understood that the disk spring can be replaced with other forms of spring devices that have similar characteristics. The force reduction to zero in the region of transmission ratio 1:1 can also be brought about by a stop installed on the backup ring 10 that limits the movability of the disk spring or that of another spring device.

A continuously variable transmission with a drive side pulley, an output side pulley, and an endless torque-transmitting member that spans the pulleys, wherein the distances between the conical disks of each pulley are adjustable in opposite directions to adjust the transmission ratio, includes a spring device that biases the drive side pulley from a large spacing of its conical disks in the direction of a reduction of the spacing.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A continuously variable transmission comprising: an input shaft; a width-adjustable input pulley carried by the input shaft; an output shaft; a width-adjustable output pulley carried by the output shaft; an endless torque-transmitting member that spans and interconnects the input and output pulleys; and a spring positioned to provide a spring force to bias the input pulley from a wide spacing to a narrow spacing, wherein the spring force decreases to zero as the widths of each of the pulleys approach width dimension that corresponds with a transmission ratio of 1:1.

2. A continuously variable transmission in accordance with claim 1, wherein the spring force presses input pulley conical disks together and starts at a first force level at a large spacing of the conical disks and increases to a maximum as the spacing between the conical disks decreases and then decreases as the spacing between the conical disks decreases further.

3. A continuously variable transmission in accordance with claim 2, wherein the force decreases at a greater rate than that of the force increase.

4. A continuously variable transmission in accordance with claim 1, wherein the spring is a plate spring.

5. A continuously variable transmission in accordance with claim 4, wherein the spring is carried between a conical disk that is axially movable relative to the input shaft and a contact element that is fixed to the input shaft.

6. A continuously variable transmission in accordance with claim 5, wherein the spring extends outwardly substantially radially from the conical disk to the contact element.

7. A continuously variable transmission in accordance with claim 6, wherein the movable conical disk includes a shoulder and the spring has an inner periphery that contacts the shoulder.

8. A continuously variable transmission in accordance with claim 6, wherein the contact element includes an inwardly-facing groove that receives an outer periphery of the spring.

9. A continuously variable transmission in accordance with claim 1, wherein the spring is of frustoconical form.

10. A continuously variable transmission in accordance with claim 1, wherein the spring force is operative only between an underdrive condition of the transmission and a transmission ratio of about 1:1.

* * * * *

UNITED STATES PATENT AND TRADEMARK OFFICE
CERTIFICATE OF CORRECTION

PATENT NO. : 6,589,126 B1  Page 1 of 1
DATED : July 8, 2003
INVENTOR(S) : Eric Müller and Oswald Friedmann It is certified that error appears in the above-identified patent and that said Letters Patent is hereby corrected as shown below:

<u>Title page,</u>
Item [73], Assignee, the Assignee's name is corrected to read as follows: -- LuK Lamellen und Kupplungsbau Beteiligungs KG, Bühl (DE) --.

Signed and Sealed this

Seventh Day of October, 2003

JAMES E. ROGAN
*Director of the United States Patent and Trademark Office*